Nov. 17, 1953   R. T. TOWNSEND   2,659,402
SKINNING MACHINE FOR FLAT PORK CUTS
Filed March 31, 1948   6 Sheets-Sheet 1

Inventor:
Ray T. Townsend
By Bair & Freeman
Attys

Fig. 4.

Patented Nov. 17, 1953

2,659,402

UNITED STATES PATENT OFFICE 2,659,402

SKINNING MACHINE FOR FLAT PORK CUTS

Ray T. Townsend, Des Moines, Iowa

Application March 31, 1948, Serial No. 18,204

10 Claims. (Cl. 146—130)

This invention relates to skinning machine and is adapted particularly for skinning flat pork cuts such as bacon, fat backs, etc. An objection to previously known skinning machines of this general type is such that old skinning machines were inefficient and ineffective for proper skinning of flat pork cuts. The pork cuts become distorted in shape and wrinkled, and do not lie perfectly flat, and, because of this it is difficult to cut the skin evenly and uniformly. A straight blade will, due to the deformations in shape or wrinkles in the pork cuts, cut off too much fat from the flesh at one point and not enough at other points, and often cuts through the skin, leaving portions of the skin attached to the flesh which must be cut off by hand.

An object of the present invention is the provision of means for retaining pork cuts perfectly flat so that the skinning blade will cut off the skin evenly all along the area to be cut.

Another object of the invention is the provision of a plurality of independently suspended hold-down shoes which bear on the pork cuts in such a manner that the pork cuts are retained perfectly flat.

A further object of the invention is the provision of hold-down shoes as referred to above which, in addition to holding the pork cuts flat, also urge the pork cuts into position for the skinning operation to become effective.

A still further object of the invention is the provision of such hold-down shoes which are lifted from the pork cuts at the end of the skinning operation so that the pork cuts are released and permitted to fall from the skinning machine into a receptacle or onto a conveyor.

Still another object is the provision of such hold-down shoes which are lifted up out of the operative position at the end of the skinning operation on each pork cut so that the succeeding pork cut can be placed in position for skinning.

Another object of the invention is the provision of a skinning machine, such as is referred to above, wherein the hold-down shoes operate in a predetermined cycle with relation to the skinning operation.

A still further object of the invention is the provision of such a skinning machine of which the critical operating parts may be easily disassembled for cleaning purposes, for sharpening the skinning blade, and for replacement purposes.

With these and other objects in view, my invention consists in the construction, arrangement and combination of the various parts of my device whereby the objects contemplated are attained as hereinafter more fully set forth, pointed out in my claims and illustrated in the accompanying drawings, wherein:

Figure 1:
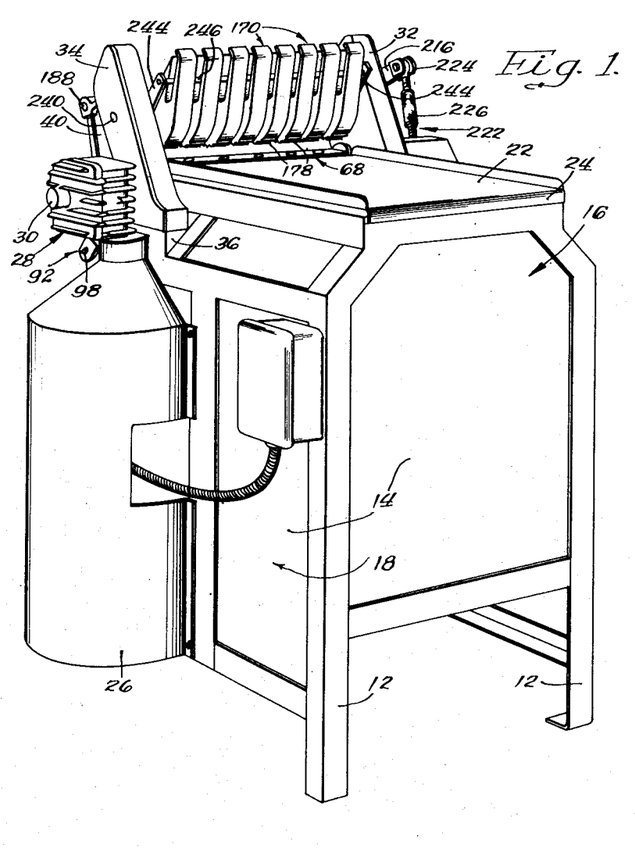
Figure 1 is a perspective view of the skinning machine showing the front and left side thereof.
Figure 2:
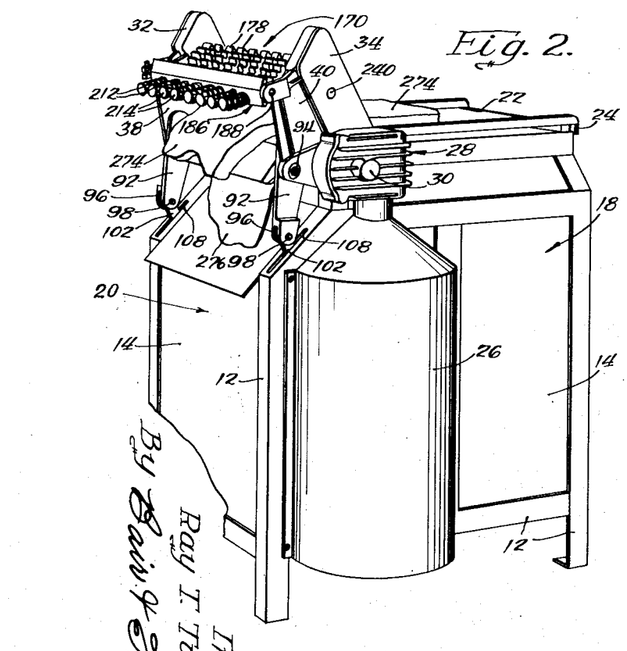
Figure 2 is a perspective view of the machine showing the rear end and side thereof.

Referring in detail to the drawings, the skinning machine as a whole, as illustrated in Figures 1 and 2, includes certain structural members 12 which may be in a form of angle members or other desired elements. These structural members 12 are shaped and assembled so as to form the desired shape cabinet and a plurality of panels 14 are secured to the structural members for closing the cabinet and housing certain of the operative parts.

For purposes of convenience, the reference numeral 16 refers to the front of the machine, the numeral 18 to the left side of the machine, and the numeral 20 to the rear of the machine. A removable supporting table 22 is positioned on the top of the cabinet, resting on adjusting bolts and lock nuts for adjusting the table vertically a limited extent. The table 22 has a downturned front flange 24.

A housing 26 is secured to the left side of the machine for the purpose of enclosing an electric motor or other desired form of driving means. The electric motor or driving means is provided with a vertical shaft extending upwardly out of the housing 26 and into a gear reduction housing 28. The vertical shaft from the driving means may be provided with a worm which co-operates with a worm gear having a horiozntal axis indicated by the point 30. The worm gear is connected with a skinning roller in the machine which will be referred to later in detail.

Secured to the cabinet near the rear thereof are a pair of housings 32 and 34 which extend upwardly and toward the rear of the cabinet and are supported directly on projections 36 on the cabinet and through which the housings communicate with the interior of the cabinet. Secured to or formed integral with the housings 32 and 34 are bearing plates 38 and 40 lying generally in the respective planes of the housings and extending to the rear thereof. These plates 38 and 40 are for the purpose of pivotally supporting certain working parts of the machine.

Figure 3:
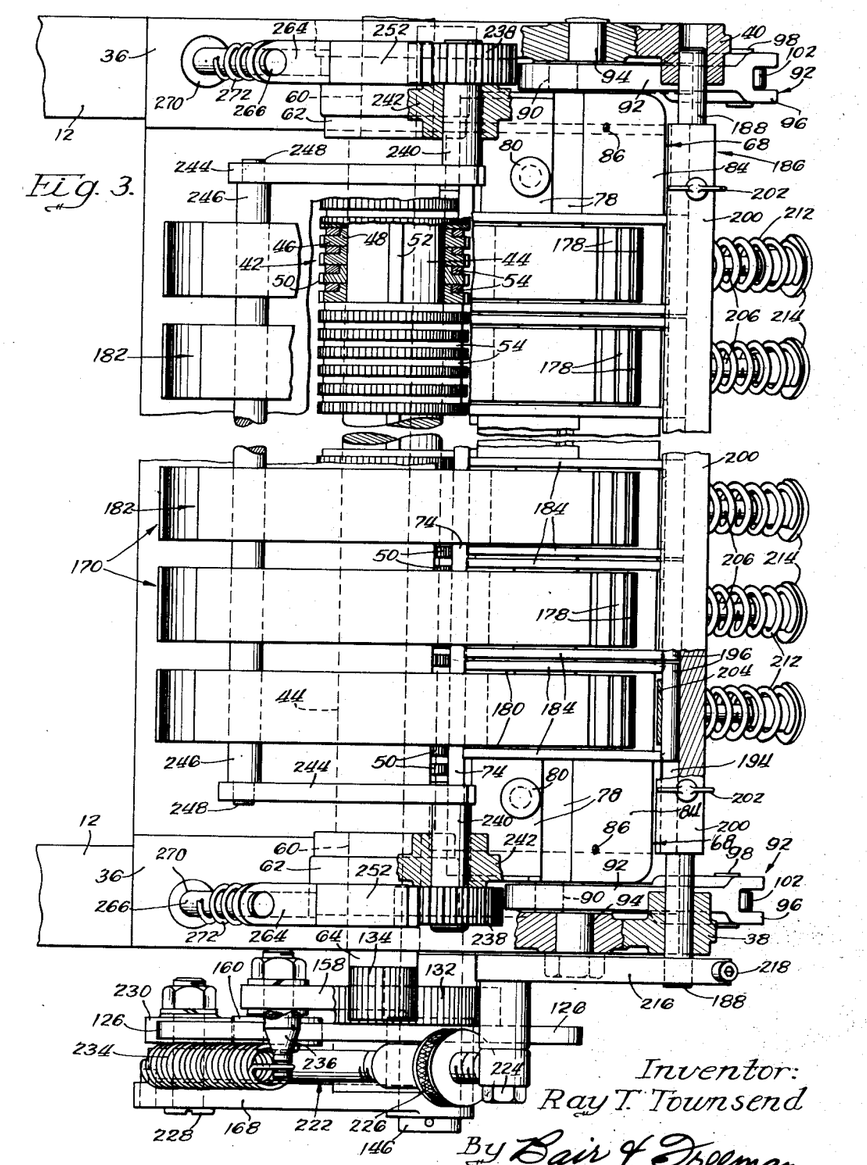
Figure 3 is an enlarged plan view of the rear portion of the machine showing certain operating parts, portions being broken away.

For purposes of clarity, both of the housings 32 and 34 have been omitted from Figure 3, and the housing 32 has been omitted from Figures 4, 5, 6 and 7.

The skinning roller referred to above is illustrated as a whole at 42 and includes a shaft 44 to which the worm gear in the housing 28 is secured. The skinning roller 42 extends transversely across the machine. Fitted on the shaft 44 are a plurality of rings 46 slidable longitudinally thereon, and each having an offset axially-extending foot portion 48 (Figure 3). These foot portions 48 space the rings 46 apart, leaving spaces between the major portions of the adjacent rings. Formed on the periphery of each ring 46 are a plurality of teeth 50 extending peripherally therearound. The shaft 44 and rings 46 are provided with keyways and a key 52 for securing the rings against rotation with respect to the shaft. Stripper plates 54 are placed between the adjacent rings 46 on the shaft. These stripper plates 54 are permitted free rotation with respect to the rings 46 and are of approximately the same, or slightly less, in thickness as the spaces between the rings. The stripper plates 54 are circular for the most part, and have a radius slightly less than that of the teeth 50. The stripper plates 54 are each provided with an extension 56 which extends radially outwardly beyond the teeth 50 and is adapted to engage against an abutment 58 on the frame of the cabinet. The abutment 58 serves as a stop for limiting the rotation of the stripper plates.

The shaft 44 of the skinning roller is provided with reduced extensions 60 at its ends which are mounted in bearing supports 62 formed on the frame of the machine. The inner faces of the bearing supports 62 serve as thrust surfaces for the rings 46 on the skinning roller. The enlarged portions of the bearing members 62 are of slightly larger diameter than teeth 50 to provide means for limiting the extent to which the pressure shoe can be moved toward the roller. The pressure shoe will be described later in detail.

The reduced extension 60 of the shaft at the top of Figure 3 is that portion which extends into the gear reduction housing 28. The reduced extension 60 at the lower end of Figure 3 extends through its respective bearing support 62 and out of the cabinet as indicated at 64.

The table 22 is approximately at the height of the upper extremity of the skinning roller 42, the table having minor vertical adjustability, and the inner edge of the table terminating slightly short of the roller as indicated at 66.

Co-operating with the skinning roller 42 is a pressure shoe 68 having a concave surface 70 and a cut-out portion near the top thereof, forming a supporting surface 72 upon which is mounted a skinning blade 74. The cut-out portion forming the supporting surface 72 is also provided with a rear vertical surface 76, and a lock block 78 is fitted over the skinning blade 74 in the cut-out portion. A plurality of bolts 80 are inserted through the lock block 78 and through slots in the skinning blade 74 and then through the main portion of the pressure shoe and extend out of the bottom thereof, where nuts 82 are provided for locking the assembly together and thereby the skinning blade 74 in place.

The pressure shoe 68 is provided with a weighted portion 84 which extends rearwardly and downwardly from the main portion of the shoe. Threaded holes 86 are provided in the pressure shoe in lines with the skinning blade 74. Screws 88 are threaded in the holes 86 and into engagement with the skinning blade for serving as stop means for limiting the movement of the skinning blade into the shoe. By means of the screws 88, the skinning blade can be adjusted outwardly of the pressure shoe.

It will be understood, of course, that the pressure shoe 68 extends transversely of the machine at least for the full length of the toothed rings 46, and it actually extends axially beyond the inner surfaces of the bearing supports 62 in overlapping relation thereto. The bearing supports 62 thereby serve as limiting means for limiting the extent of movement of the pressure shoe toward the skinning roller 42, and for preventing clashing of the pressure shoe with the teeth 50 on the skinning roller 42.

The skinning roller 42 and the pressure shoe 68 and their interco-operation are included in the subject matter and claimed in my Patent No. 2,455,831, issued December 7, 1948, and my co-pending application, Serial No. 680,939, filed July 2, 1946. Attention is also directed to my co-pending application, Serial No. 730,415, filed February 24, 1947, which discloses and claims a pressure shoe having a counterbalance weight, such as described herein. Application Serial No. 730,415 became Patent No. 2,578,952 on December 18, 1951.

As in my co-pending application just referred to, the skinning blade 74 herein is substantially tangent to the skinning roller 42, when the pressure shoe 68 is in operative position.

The lock block 78 is provided to each end with an outwardly longitudinally extending stub shaft 90 for pivotally supporting the pressure shoe 68 in a pair of arms 92. The stub shafts 90 extend into suitable bearings in the upper ends of the arms 92, the latter being pivoted by means of bolts or the like 94 which in turn are supported in the lower ends of the plates 38 and 40 (Figures 2 and 3). The bolts 94 form pivot points for the arms 92 and are disposed below the pivot point (stub shafts 90) of the pressure shoe 68. Each arm 92 has a forked portion 96 at its lower end in which is provided a pin 98. A yoke 100 is shown in its entirety in Figure 9 and is pivotally secured in the lower ends of the arms 92. The yoke 100 includes a pair of spaced arms 102, interconnected by a brace member 104. The arms 102 are inserted in the forked portions 96 of the respective arms 92 and the pivot pins 98 are inserted through holes in the forked portions 96 and through holes 106 in the outer ends of the arms 102. The yoke member 100 is inserted in place by placing it in the interior of the cabinet of the machine and extending the arms 102 out through slots 108, formed in the frame of the machine, and the greater part of the brace member 104 is thereby disposed in the interior of the cabinet. Secured as by welding to the lower edge of the brace member 104 is a threaded stud 110. Threaded onto the stud 110 is an interiorly threaded sleeve 112 having a semi-cylindrical segment cut off from the lower portion thereof. Notches 114 are formed in the face of the shoulder formed by the cut off portion. At the bottom end of the sleeve is a hole 120 in which is hooked a light tension spring 122. The other end of the spring 122 is secured to a leg 124 secured to the frame of the machine and disposed in the interior thereof.

A cam 126 is mounted on a shaft 128 in the frame of the machine and disopsed on the exterior of the cabinet. The shaft 128 is mounted in an eccentric bushing 130 in a bearing mounting on the frame for purposes of adjusting the shaft 128 and cam 126, transversely of the axis thereof. Secured to and concentric with the cam 126 is a gear 132 adapted to mesh with gear teeth 134 formed on the extended end of the reduced portion 64 of the shaft 44 of the skinning roller. By adjusting the eccentric bearing 130, the gear 132 can be adjusted into proper meshing engagement with the gear 134.

The cam 126 is for the most part circular and regular in contour, but is provided with a depression 136 interconnecting an approach surface 138 and a receding surface 140. The cam 126 rotates counterclockwise as indicated by the arrow 142 being rotated by the skinning roller 42 which rotates in the opposite direction as indicated by the arrow 144.

A rock shaft 146 is mounted in the interior of the cabinet in brackets 148 which are secured by suitable bolts 150 to the frame of the cabinet. The rock shaft 146 extends out of the cabinet on the right hand side thereof, or at the lower end of Figure 3. One of the brackets 148 is provided with an extension 151 extending down and generally parallel with that portion of the machine in which the slots 108 are formed. A set screw 152 is threaded in the extension 151 and is provided with a lock nut. The extended end of the set screw 152 is adapted to engage the brace member 104, or one of the arms 102, in the yoke 100.

Figure 4:
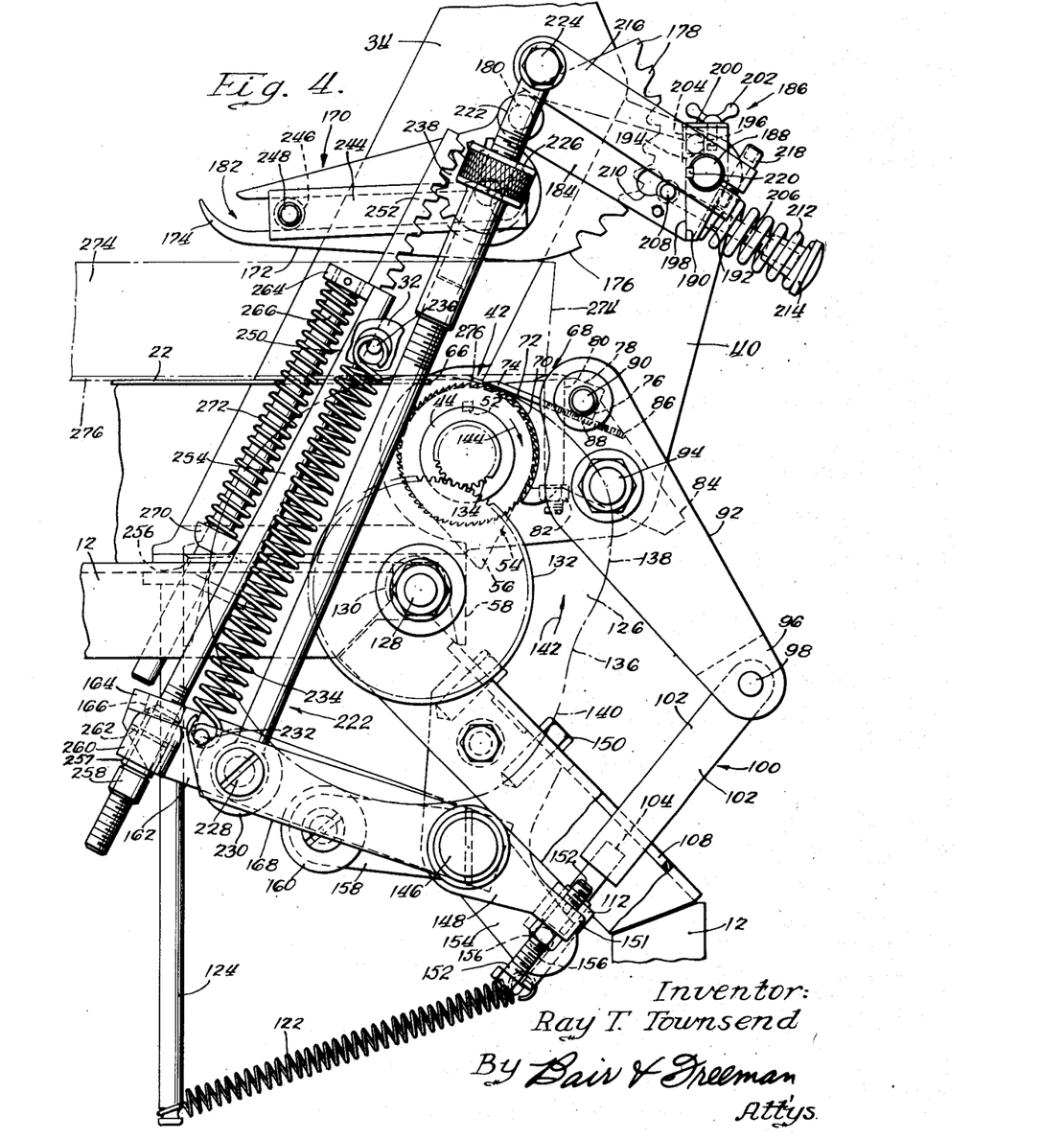
Figures 4, 5, and 6 are side views as viewed from the bottom of Figure 3, showing the principal operating parts with portions of the frame of the machine removed for clarity.
Figure 5:
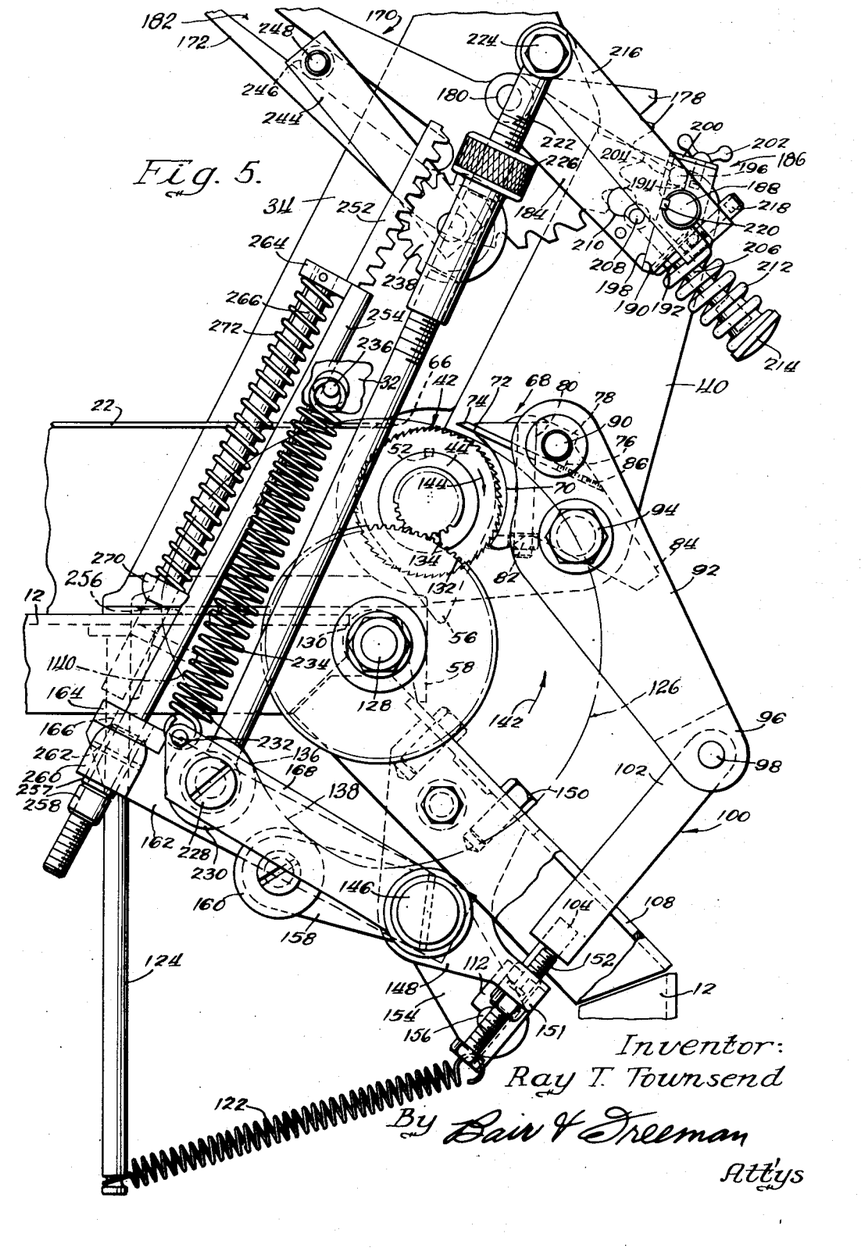

One or more arms 154 are secured to the rock shaft 146 so that the arms swing upon rocking of the rock shaft. The arms 154 extend down to a position adjacent the end of the extension 151 on the bracket 148 and is provided with a transverse pin 156. The yoke 100 is adapted to be swung into position such that the notches 114 fit over the pin 156. This forms a detachable connection between the sleeve 112 and the pin 156 and the sleeve 112 is retained in such detachably connected position by means of the tension spring 122 which biases the yoke 100 downwardly and to the left (Figures 4 and 5). The extended end of the bolt 152 engages the brace member 104 to limit the downward movement of the yoke 100, and when the latter is so limited, the pin 156, on continued swinging of the arm 154 is adapted to ride down the lower extremity of the sleeve 112.

Also secured to the rock shaft 146 is an arm 158 extending to the left of the rock shaft. The arm 158 is so connected with the rock shaft that the arm swings on rocking of the rock shaft. A cam follower roller 160 is pivoted in the extended end of the arm 158 and so disposed as to engage the cam 126 and be controlled thereby.

An arm 162 is secured to each end of the rock shaft 146 and adapted to swing on rotation of the rock shaft 146. The arms 162 also extend to the left of the rock shaft, and are of considerably greater length than the short arm 158. Each arm 162 is provided with a horizontal turned over portion 164 through which is formed a hole 166.

Another arm 168, is pivotally supported on the rock shaft 146 and arranged for swinging independently of the rotation of the rock shaft 146. The arm 168 is intermediate in length with respect to the arms 158 and 162.

The arms 158 and 168 are disposed outside of the cabinet of the machine adjacent the observer of Figure 3, and adjacent the cam 126, and the arms 162 are disposed inside the cabinet of the machine under the housings 32 and 34, respectively.

A plurality of hold down shoes 170 are disposed above the skinning roller 42, in closely spaced relation across the machine. Each hold down shoe 170 has a generally flat and smooth undersurface 172, terminating in an upwardly curved portion 174 at the leading or front end thereof. At the opposite end the under surface 172 terminates in an upwardly curved surface 176 in the upper end of which are a plurality of teeth 178. The surface 176 and teeth 178 are preferably substantially concentric about pivot point 180 in the form of pins extending transversely out of opposite sides of the hold down shoes. A slot 182 is formed in the forward end of each hold down shoe and extends rearwardly to a point below the pivot point 180.

Each hold down shoe 170 is supported by a pair of arms 184, one on either side of the hold down shoe. The ends of the arms 184 are provided with holes for forming bearing supports and receiving the pins 180 on the hold down shoes. The arms 180 extend rearwardly where they are supported by a rock bar 186 so termed for convenience. The rock bar 186 extends transversely across the machine and is provided with a short stub shaft 188 extending outwardly from each end. The stub shafts 188 extend into and are pivoted in bearing openings in the upper ends of the plates 38 and 40 on the housings 32 and 34. The rock bar 186 is thus pivoted for free rocking movement in the plates 38 and 40.

The rock bar 186 has a vertical front surface 190, and an inclined surface 192 at the lower portion of the rear thereof. Formed in the front surface 190 adjacent the upper edge thereof, is a groove 194, extending the length of the rock bar and opening out of the front surface 190.

Each pair of arms 184 are connected together by a pin 196 welded across them adjacent the upper and rear edge of the latter and disposed in the groove 194. Each pin 196 is of a length substantially the width of the pair of arms.

The rear surface 198 of the arms 184 is adapted to come into engagement with the front surface 190 of the rock bar, and the rear surface 198 is so shaped that when it is in engagement with the surface 190, the arms 184 extend forwardly and upwardly. It is understood that each hold down shoe 170 is provided with a pair of supporting arms 184 and secured in place on the rock bar 186 in the manner just described.

A plate 200 extends across the top of the rock bar 186 and held in place thereon by means of a plurality of wing screws 202 threaded into holes in the rock bar. A plurality of plates 204 are welded to the front edge of the top plate 200, and extend downwardly into engagement with the front surface 190 of the rock bar. One such plate 204 is provided for each pair of arms 184 and covers the front or open side of the groove 194 for retaining the respective pin 196 in the groove. The arms 184 are thus held in position on the rock bar. The pins 196 are adapted to rotate in the groove 194, whereby the arms 184 are adapted to have limited vertical swinging movement with respect to the rock bar.

Figure 6:
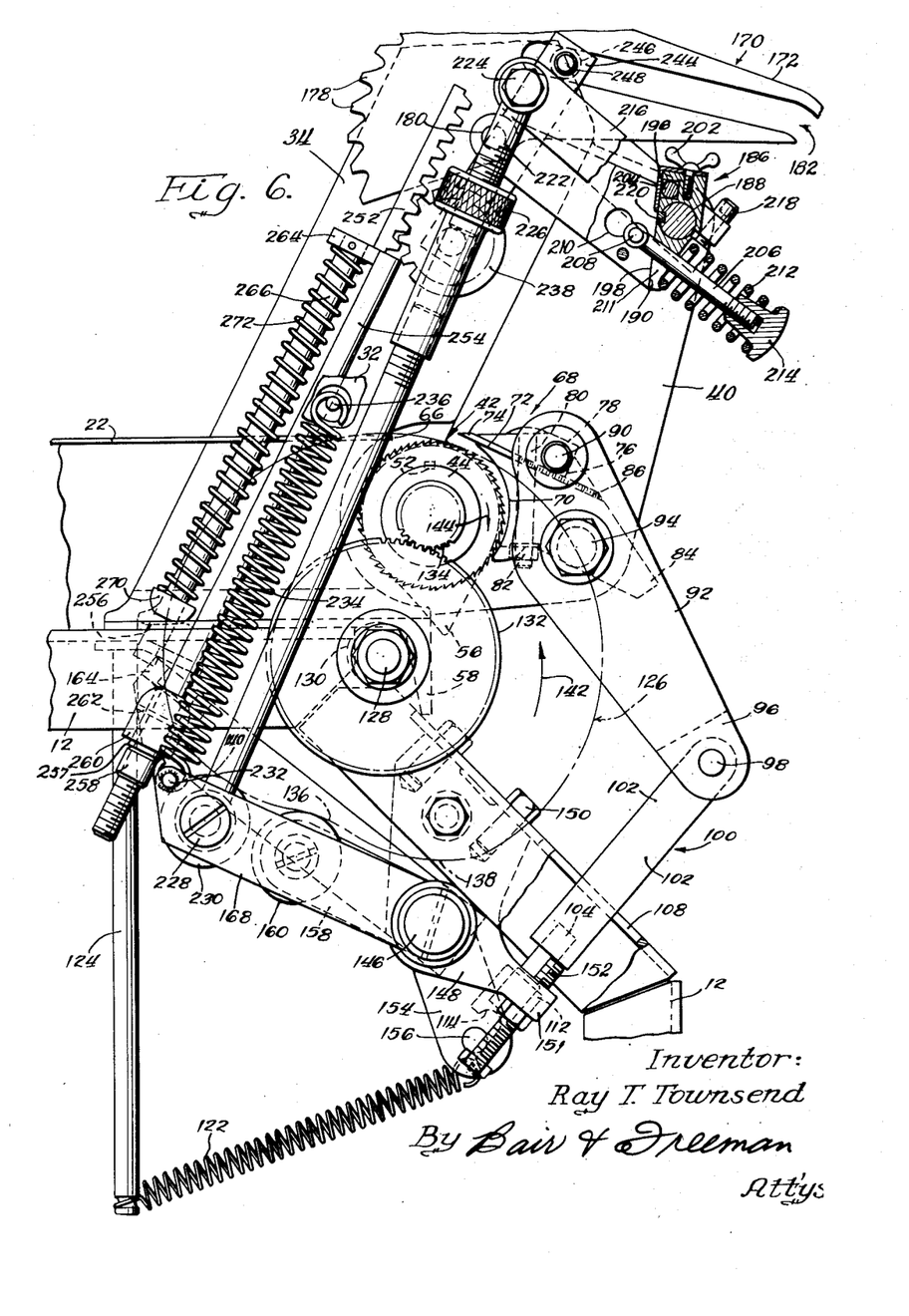

Associated with each pair of arms 184 is a bolt 206 having one end disposed between the respective plates and having a cross pin 208 at that end. The ends of the cross pin 208 extend through key hole slots 210 formed in the arms 184. The bolt 206 then extends rearwardly between the plates and through a downwardly opening slot 211 in the rock bar 186 (Figure 6). Surrounding the bolt 206 beyond the rock bar is a compression spring 212 held in place by a cap 214 threaded on the outer end of the bolt. The spring 212 is then biased between the cap 214 and the inclined surface 192, whereby the bolt is biased rearwardly and thereby the arms 184 are biased downwardly. By compressing the spring 212 to the right against the cap 214, the bolt can be swung clockwise in the slot 211 to a position below the rock bar; then the top plate 200, carrying the front plates 204, can be removed, after which the hold-down shoes can be withdrawn from the rock bar 186.

Another arm 216 is secured to one end of the stub shaft 188, at the end of the rock bar adjacent the observer of Figure 3, or the right hand side of the machine. The arm 216 has a hole for receiving the respective stub shaft 188, and a bifurcated end for receiving a screw 218 for clamping together the bifurcated portions and binding the arm to the stub shaft 188. A key 220 may also be interposed between the arm 216 and the stub shaft 188 for locking the two together for rotation.

A connecting rod 222 is pivoted by means of a bolt 224 in the swinging end of the arm 216. The connecting rod 222 is made in sections interconnected by means of an adjusting screw sleeve 226. Upon rotation of the adjusting sleeve 226, the connecting rod 222 can be lengthened or shortened. The connecting rod 222 extends downwardly where the lower end is pivoted at 228, in the swinging end of the arm 168 which is mounted on the rock shaft 146. The pivot point 228 also supports a cam follower roller 230 which is adapted to engage the cam 126. In the extreme swinging end of the arm 168 is a pin 232 supporting the lower end of a tension spring 234. The upper end of the spring 234 is hooked onto a pin 236 which is mounted on and extends outwardly from the adjacent housing 32. It will be recalled that the housing 32 has been omitted from the illustrations for purposes of clarity, but a fragment of that housing is indicated in Figures 4, 5 and 6.

Adjacent each side of the machine and outwardly beyond the plurality of hold down shoes 170 is a pinion 238. Each pinion is secured to a stub shaft 240, the stub shafts being rotatably mounted in the frame of the machine. Portions of the frame in which the shafts 240 are mounted are shown at 242 (Figure 3). These pinions 238 are disposed vertically above the supporting projections 36 on the cabinet frame, and the stub shafts 240 extend inwardly toward each other to points adjacent the outermost hold down shoes 170. Fixed to the inner end of each stub shaft 240 is an arm 244 extending toward the front of the machine and generally along the slots 182 in the hold down shoes. A rod 246 extends through all of the slots 182 in the hold down shoes, the slots 182 being in alignment, and the outer ends of the rod 246 are secured in the outer swinging ends of the arms 244 as indicated at 248. The stub shafts 240, or the pivot point of the pinions 238, are located below the pivot point 180 of the hold down shoes 170, as will be noted from Figure 4.

A rack bar indicated generally at 250 is formed of a rack 252 and a main shank 254. One such rack bar 250 is provided at each side of the machine for the respective pinion 238. The rack 252 is adapted to have engagement with the respective pinion 238 and the main shank 254 extends downwardly through a hole 256, formed in the supporting surface 36. The rack bars, therefore, extend into the interior of the cabinet. The rack 252 is offset with respect to the shank portion 254 so that the pitch line of the rack forms a longitudinal extension of the center line of the shank 254. The lower ends of the shanks 254 extend through the respective holes 166 formed in the swinging ends of the arms 162. A sleeve 257 is threaded on the lower end of each shank 254 below the portion 164 of the arm 162, and held in place by a lock nut 258. An outer sleeve 260 is positioned over the sleeve 257 and connected by means of a shear pin 262, extending transversely therethrough and through the shank. The upper end of the outer sleeve 260 is curved, forming a bearing surface for engagement with the marginal edge of the hole 166. The outer sleeve 260, therefore, forms an abutment whereby on downward swinging of the arm 162, the rack bar is drawn downwardly. An offset portion 264 is secured to the upper end of the shank 254, and a rod 266 is secured to and extends downwardly from the offset portion 264. The rod 266 extends down through a portion of the hole 256, in the supporting surface 36. Surrounding the rod 266 adjacent the lower end thereof is a collar 270, and biased between the collar 270 and the offset portion 264 is a compression spring 272 which biases the rack bar 250 upwardly.

The pinions 238 and the upper ends of the rack bars 250 are enclosed in the respective housings 32 and 34.

*Use and operation*

The cycle of operation of the machine is illustrated in various steps in the cycle in Figures 4, 5 and 6. Figure 4 shows all of the parts in the positions assumed when operative and when a piece of bacon is being skinned. A point in this portion of the operating cycle will, for purposes of convenience in the description of the operation of the machine, be taken as the beginning and end of the cycle, because of the peculiar compound motions of the operating parts of the machine and because in this position most of the operating parts are in substantial equilibrium; however, the operator of the machine may consider the cycle to begin and end at some point where one piece is skinned and another can be inserted. This point will be referred to later. A slab of bacon 274 rests on the table 22. The hold down shoes 170 are in lowered position so that a portion of the lower surfaces 172, and the curved surfaces 176 are biased into engagement with the top of the bacon. The bacon is, therefore, held down flat across the width of the bacon, because of the presence of a plurality of hold down shoes. In this position of the operating parts, the depression 136 of the cam 126 is turned to such a position that the cam follower rollers 160 and 230 are in engagement with the enlarged or normal curved surfaces of the cam. In this position, the arm 158 has been rotated counterclockwise. In the movement which brings the arm 158 to the position of Figure 4, the rock shaft 146 and thereby the arm 154 are also rotated counterclockwise. The pin 156 in the arm 154 forces the yoke 100 to the rear and upwardly, thereby swinging the arms 92 counterclockwise about their pivot points 94. This swinging of the arms 92 carries the pressure shoe 68 to the left, bringing the concave surface 70 of the pressure shoe toward the skinning roller 42, and the skinning blade 74 down into close proximity to the skinning roller. Pressure shoe 68 as illustrated in Figure 4 is in position for forming a skin pulling means with the skinning roller. In the same position of the cam, the rock shaft 146 having been rocked counterclockwise, the arm 162 is also swung downwardly. This downward swinging of the arm 162 draws downwardly on the rack bar 250 and rotates the pinions 238 counterclockwise. This rotation of the pinions 238 swings the arms 244 and thereby swings the hold down shoes 170 about their pivot points so that the rear portions of the surfaces 172 of the hold down shoes are brought down into engagement with the top of the bacon.

On rotation of the skinning roller 42, the skin 276 is cut from the bacon by the skinning blade 74 and the skin is pulled by the teeth of the skinning roller acting on the concave surface 70 of the pressure shoe. The skin drops down under the pressure shoe and the slab of bacon passes over the pressure shoe, as illustrated in Figures 2 and 4.

On continued rotation of the cam 126 (driven by the skinning roller) the depression 136 moves over to the position of Figure 5, whereby the cam follower 230 falls into the depression in the cam. The tension spring 234 is then permitted to bias the arm 168 upwardly and when the cam follower 230 falls into the depression, the connecting rod 222 is biased upwardly by action of the spring 234. The upward movement of the connecting rod 222 swings the arm 216 upwardly and thereby rocks the rock bar 186 clockwise. As explained above, the rock bar 186 is freely rotatable in its pivot supports, and on rocking, the front surface 190 thereof engages the rear surfaces 198 of the arms 184. The arms 184 are thereby swung upwardly, lifting the rear ends of the hold down shoes 170. At this point, the front ends of the hold down shoes are still retained downwardly by the rod 246.

As the bacon is being skinned, the hold down shoes 170 retain the bacon on the table 22, and when the skin is entirely removed from the bacon, the hold down shoes momentarily hold the bacon in place after it is skinned. The upward movement of the rear ends of the hold down shoes, as just described, releases the slab of bacon which then is permitted to fall off the rear side of the pressure shoe 68.

Although the upward movement of the hold down shoes 170 is completed when the cam follower roller 230 falls into the bottom or trough of the depression in the cam, the rotational movement of the hold down shoes has begun before the upward movement of the hold down shoes is completed. Attention is directed to Figure 5 illustrating the cam follower roller 230 substantially at the depth of the depression 136, and the cam follower roller 160 in engagement with the approach surface 138. As the cam follower roller 160 encounters the depression 136, the compression spring 272 biases the arm 162 upwardly. This biasing action rotates the rock shaft 146, retaining the cam follower roller 160 in engagement with the cam. The upward swinging of the arm 162 forces the rack bars 250 upwardly and thereby the racks 252 rotate the pinions 238 clockwise. The clockwise rotation of the pinions swings the arms 244 upwardly which rotate the hold down shoes up out of operative position. The commencement of this rotational movement of the hold down shoes is illustrated in Figure 5. The pinions 238 are eccentric to the pivot point 180 of the hold down shoes, and this eccentric movement is accommodated by the fact that the rod 246 is slidable in the slots 182. Since the hold down shoes are movable translationally, the pivot point 180 would at one time or another be eccentric to the pinions 238. The angle at which the rack bars 250 are disposed enables the compression springs 272 to bias the rack bars to the right so that the racks 252 are retained in engagement with the pinions 238.

Figure 6 shows the arms 162 in their extreme upper position, and the hold down shoes 170 rotated to their extreme position out of operative position. This is occasioned by the fact that the cam follower roller 160 is at the trough of depression 136.

As the rock shaft 146 is rotated due to the cam follower roller 160 falling into the depression in the cam (Figure 5), the arm 154 is also swung clockwise which permits the spring 122 to draw inwardly on the yoke 100. The set screw 152 is so adjusted that the yoke 100 engages it and is prevented from further movement. Even though the yoke 100 is prevented from continued movement, the arm 154 is permitted further movement because the pin 156 rides out of the notches 114 and down along the lower end of the sleeve 112.

The inward movement of the yoke 100 swings the arms 92 about their pivot points 94 and thereby swings the upper ends of the arms 92 to the right. This movement carries the pressure shoe 68 away from the skinning roller 42 and as the pressure shoe moves to the right, the weighted portion 84 thereof is effective for rotating the pressure shoe about its pivot point and swinging the blade 74 and the concave surface 70 away from the skinning roller. This position of the pressure shoe 68 is illustrated in Figure 5 and may be referred to as inoperative position. The swinging movement of the pressure shoe 68 causes the lower edge of the concave surface 70 to remain in engagement with the bearing supports 62, in normal operation of the machine.

As the cam continues from its position illustrated in Figure 5 toward its position illustrated in Figure 6, the cam follower roller 230 rides onto the receding surface 140 and causes the downward movement of the connecting rod 222 and thereby the downward translational movement of the hold down shoes. When the hold down shoes are rotated to their extreme position of rotation illustrated in Figure 6, the operator places another slab of bacon on the table 22 and moves it to the rear of the machine until the leading edge thereof is approximately over the skinning roller. Figure 6 illustrates the hold down shoes slightly lowered translationally by reason of the fact that the cam follower roller 230 has moved out of the trough of the depression, and will be completely lowered when this roller moves off of the receding surface 140. Closely following the downward movement of the hold down shoes, is the rotational movement thereof. The cam follower 160 rides onto the receding surface 140 and as it does so, the arm 162 is lowered, thereby drawing the rack bar 250 downwardly and rotating the pinions 238. This movement causes the hold-down shoes to rotate counterclockwise to the position of Figure 4. When the hold-down shoes are thus rotated counterclockwise, and it will be recalled that they have been already lowered translationally, the teeth 178 engage the leading edge of the slab of bacon and urge it to the right and into the skinning blade. This action of the hold-down shoes not only urges the slab of bacon against the skinning blade, but also bends down on the leading edge of the slab, so that the leading edge of the skin is pressed down and under the skinning blade. Thus, for initiating the skinning operation, the edge of the skinning blade need be spaced from the skinning roller a minimum distance.

The arm 154 is also being rotated counterclockwise which moves the yoke 100 to the right and upward, and this latter movement swings the arms 92 counterclockwise, moving the pressure shoe 68 into operative position with respect to the skinning roller, as illustrated in Figure 4. Thus, the pressure shoe 68 is moved into operative position substantially at the same time that the slab of bacon is being urged against the skinning blade. The speed of rotation of the hold-down shoes is such that the teeth 178 travel at a peripheral rate of speed slightly faster than the peripheral rate of speed of the teeth 50 on the skinning roller, and thereby slightly faster than the rate at which the slab of bacon is drawn by the skinning roller in the skinning operation. When the hold-down shoes are in operative position, as illustrated in Figure 4, the swinging ends of the hold-down shoes (i. e., the ends to the left) are slightly raised so that the under surface 172 is disposed at an inclined angle with respect to the top surface of the bacon slab. The rear or trailing ends of the surfaces 172, and the curved surfaces 176, are then effective for directly engaging the meat.

As mentioned above, the operating cycle may be considered as beginning and ending at a point where one piece is skinned and another piece can be inserted, as this may be practical from a user's standpoint. Such is also the beginning and end of a cycle as used in the claims herein, and may be a point approximately the position of the parts shown in Figure 6.

Figures 7, 8, 9:
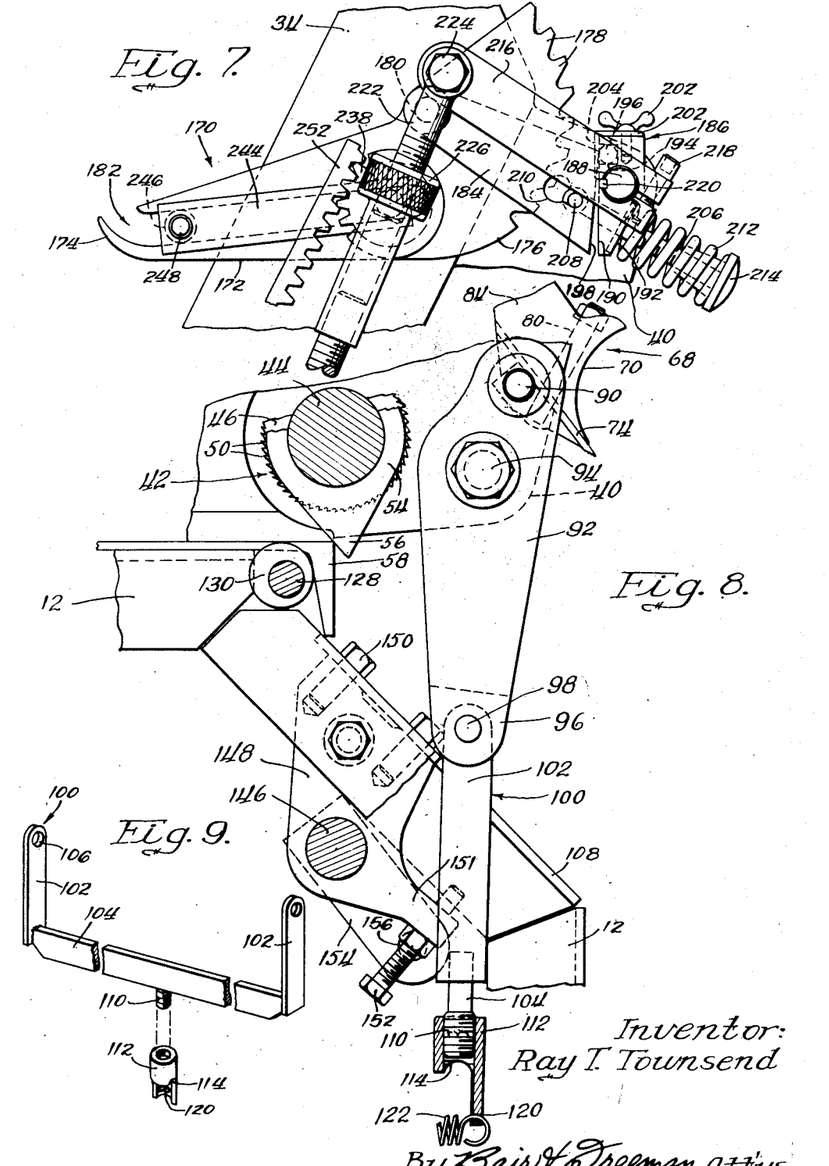
Figure 7 is a detail view, showing a further position of the upper part of the mechanism illustrated in Figures 4, 5 and 6.
Figure 8 is a side view of the lower portion of the illustration of Figures 4, 5 and 6 showing the pressure shoe turned for cleaning purposes.
Figure 9 is a detail view of a yoke member used as one of the connecting parts for the linkage which operates the pressure shoe.

As described above, each hold-down shoe 170 is mounted independently of each of the others, being mounted in the arms 184 which have pivotal movement about the pin 196. If a portion of the bacon slab is thicker than other portions, it will raise the respective hold down shoe upwardly, as illustrated in Figure 7. In Figure 7, it will be seen that the under surface 172 is approximately level indicating that the rear end has been raised; and it will also be noted that the rear surface 198 of the arms 184 is parted from the front vertical surface 190 of the rock bar 186; the upward movement of the hold down shoes has swung the arms 184 upwardly. The compression spring 212 is compressed by the upward swinging action of the arms 184. Thus, if the bacon slab should be of uneven thicknesses transversely thereof, the individual hold down shoes 170 act to retain the bacon slab perfectly flat at all points thereacross. After any thick portion passes by the hold down shoes, the compression springs 212 again move the arms 184 downwardly and thereby move the hold down shoes downwardly.

Figure 6 illustrates the limit of movement of the yoke 100. The set screw 152 is engaged by the member 104 or one of the arms 102 preventing further downward movement and thus limiting the extent to which the pressure shoe 68 is moved away from the skinning roller. However even though the yoke 100 is prevented from further movement, the arm 154 may continue to swing and the pin 156 moves out of the notches 114 and rides down along the lower end of the sleeve 112. The spring 122 meanwhile retains the sleeve 112 in sliding engagement with the pin 156.

For purposes of cleaning the machine, and particularly the pressure shoe 68 and skinning roller 42, and for sharpening the skinning blade 74, the respective parts may be moved to the position illustrated in Figure 8. From the position illustrated in Figure 6, the yoke 100 can be urged downwardly away from the set screw 152 and away from the pin 156. The yoke 100 can then be positioned vertically to swing the arms 92 clockwise to substantially the position of Figure 8. This position carries the upper swinging ends of the arms 92 farther away from the skinning roller 42 and thereby also moves the pressure shoe 68 farther away from the skinning roller. The pressure shoe can then be rotated counterclockwise, the skinning blade clearing the roller, to approximately the position shown in Figure 8. The concave surface is turned away from the roller and exposed in a position for easy cleaning of the parts, and for sharpening the skinning blade.

Some changes may be made in the construction and arrangement of the parts of my machine without departing from the real spirit and purpose of my invention, and it is my intention to cover by my claims such modified forms of structure or use of mechanical equivalents as may be reasonably included within their scope.

I claim as my invention:

1. A skinning machine comprising, in combination, a frame, skinning means operably mounted on the frame, a table mounted on the frame for supporting an object to be skinned in position to be fed to said skinning means, a plurality of aligned hold down shoes operably mounted on the frame for translational movement toward and from said table and for rotational movement, means for translationally moving said hold down shoes, said hold down shoes having aligned slots therein, an arm disposed adjacent each outermost hold down shoe, said arms being pivoted on a common axis and having their swinging ends in register with said slots, a rod interconnecting the swinging ends of said arms and disposed in said slots, and means for swinging said arms.

2. A skinning machine comprising, in combination, a frame, a roller operatively mounted on the frame, means cooperating with said roller to form a skinning means, a table mounted on the frame adjacent said skinning means, hold down shoes mounted for rotatable movement into and out of operative position adjacent said table, pinion means operatively associated with said hold down shoes for rotating the latter, rack means for actuating said pinion means, cam means operated by said roller, and means actuated by said cam means for operating said rack means.

3. A skinning machine comprising, in combination, a frame, a roller operatively mounted on the frame, a pressure shoe mounted for movement into and out of operative position with respect to said roller, said pressure shoe having a working surface cooperable with said roller to form a skinning means, a table mounted on the frame for supporting an object to be skinned in position to be fed to said skinning means, a skinning blade mounted on said pressure shoe, said skinning blade being adapted to part the skin from the object, said working surface and roller being adapted to grip the skin from the object and upon rotation of the roller to draw the skin and object against said skinning blade, means in addition to said roller for moving the object against said skinning blade for initiating the skinning operation, cam means, means to simultaneously rotate said cam means and said roller, means operated by said cam means for moving said pressure shoe into operative position and a second means operated by said cam means for actuating said additional object moving means, the movement of said pressure shoe and the action of said additional object moving means being simultaneous.

4. A hold down shoe assembly comprising, in combination, a bar adapted to be mounted horizontally, said bar having a substantially flat surface disposed generally vertically, a groove in said flat surface adjacent the top thereof and extending longitudinally of the bar, a plurality of pins disposed in said groove in end-to-end relationship, an arm secured to each end of each pin and extending perpendicular thereto, detachable means secured to said bar for securing each pin in said groove, said pins being rotatable in said groove, said arms having end surfaces extending downwardly from said pins and engageable with said flat surface for limiting the swinging of said arms in one direction upon rotation of said pins, and a hold down shoe pivotally mounted in the extended ends of each pair of arms secured to respective pins.

5. A skinning machine comprising, in combination, a frame, a roller operatively mounted on the frame, a pressure shoe, the leading edge of said pressure shoe being reduced to form a cutting edge, said pressure shoe being mounted for movement into and out of operative position with respect to said roller to form a skinning means therewith, a table for supporting an object to be skinned in position to be fed to said skinning means, hold down shoes mounted for translational and rotative movement into operative position with respect to said object, cam means operated by said roller, a rock shaft mounted in the frame adjacent said cam means, cam follower means secured to said rock shaft and responsive to said cam means for rocking said shaft, means interconnecting said rock shaft and said pressure shoe for moving the latter into operative position, means interconnecting said rock shaft and said hold down shoes for moving the latter translationally toward operative position, the movement of said pressure shoe and the translational movement of said hold down shoes being responsive to and simultaneous with the rocking of said rock shaft, and means interconnecting said cam means and said hold down shoes for moving the latter rotationally toward operative position.

6. A skinning machine comprising, in combination, a frame, a roller operatively mounted on on the frame, a pressure shoe, the leading edge of said pressure shoe being reduced to form a cutting edge, said pressure shoe being mounted for movement into and out of operative position with respect to said roller to form a skinning means therewith, a table for supporting an object to be skinned in position to be fed to said skinning means, hold down shoes mounted for translational and rotative movement into operative position with respect to said object, cam means operated by said roller, a rock shaft mounted in the frame adjacent said cam means, a cam follower means secured to said rock shaft and responsive to said cam means for rocking said shaft, lost motion means interconnecting said rock shaft and said pressure shoe for moving the latter into operative position, means biasing said pressure shoe out of operative position, stop means limiting the movement of said pressure shoe with respect to the extent of movement of said rock shaft, means interconnecting said rock shaft and said hold down shoes for moving the latter translationally toward operative position, the movement of said pressure shoe and the translational movement of said hold down shoes being responsive to and simultaneous with the rocking of said rock shaft, and means interconnecting said cam means and said hold down shoes for moving the latter rotationally toward operative position.

7. A skinning machine comprising, in combination, a frame, a roller journalled on the frame, a pressure shoe, the leading edge of said pressure shoe being reduced to form a cutting edge, said pressure shoe being movable to a position closely adjacent the roller to form a skinning means therewith with said cutting edge separating the skin from an object, the skin passing between said pressure shoe and said roller and the object passing said roller beyond said pressure shoe, said pressure shoe being also movable to a position spaced from said roller, a table mounted on the frame for supporting said object in position to be fed to said skinning means, hold down shoes mounted on said frame for movement into and out of engagement with the object, cam means journalled on said frame, means for rotating both said roller and said cam means, a first means actuated by said cam means for moving said pressure shoe toward and away from said roller, and a second means actuated by said cam means for moving said hold down shoes into and out of engagement with the object.

8. A skinning machine comprising, in combination, a frame, a roller journalled on the frame, a pressure shoe, the leading edge of said pressure shoe being reduced to form a cutting edge, said pressure shoe being movable to a position closely adjacent the roller to form a skinning means therewith with said cutting edge separating the skin from an object, the skin passing between said pressure shoe and said roller and the object passing said roller beyond said pressure shoe, said pressure shoe being also movable to a position spaced from said roller, a table mounted on the frame for supporting said object to be skinned in position to be fed to said skinning means, hold down shoes mounted on said frame for translational movement toward and from said object and for rotational movement, cam means journalled on the frame, means actuated by said cam means for moving said pressure shoe toward said roller, means actuated by said cam means for moving said hold down shoes translationally toward and into engagement with said object, and means actuated by said cam means for rotating said hold down shoes while in engagement with the object to move the same forwardly, all three actuations being effected by said cam means during one cycle of operation thereof.

9. A skinning machine comprising, in combination, a frame, a roller mounted on the frame, a pressure shoe mounted movably with respect to said frame for movement into and out of operative position with respect to said roller, the leading edge of said pressure shoe being reduced to form a cutting edge which cooperates with said roller to form a skinning means therewith, cam means, means for simultaneously rotating said roller and said cam means, actuating means operated by said cam means for moving said pressure shoe relative to said frame, quick detachable connection means interposed in said actuating means, and biasing means for retaining said connection means in connected position, said biasing means tending to move said pressure shoe out of operative position.

10. A hold down shoe assembly, comprising, in combination, a bar adapted to be mounted horizontally, said bar having a stop surface disposed generally vertically, a groove in said stop surface adjacent the top thereof and extending longitudinally of the bar, a plurality of pins disposed in said groove in end-to-end relationship, an arm secured to each end of each pin and extending perpendicular thereto, detachable means secured to said bar for securing each pin in said groove, said pins being rotatable in said groove, said arms having end surfaces extending downwardly from said pins and engageable with said stop surface for limiting the swinging of said arms in one direction upon rotation of said pins, a hold down shoe pivotally mounted in the extended ends of each pair of arms secured to respective pins, and biasing means operatively connected with said bar and each of said pairs of arms for normally engaging said end surfaces of said pairs of arms against said stop surface of said bar.

RAY T. TOWNSEND.

References Cited in the file of this patent

UNITED STATES PATENTS

| Number | Name | Date |
|---|---|---|
| 546,565 | Turner | Sept. 17, 1895 |
| 591,322 | Brown | Oct. 5, 1897 |
| 1,790,619 | Harding | Jan. 27, 1931 |
| 2,155,730 | Miller | Apr. 25, 1939 |
| 2,254,969 | Lindsey | Sept. 2, 1941 |
| 2,455,831 | Townsend | Dec. 7, 1948 |
| 2,539,692 | Hickman et al. | Jan. 30, 1951 |